F. J. NOECHEL.
CORN HUSKING MACHINE.
APPLICATION FILED MAY 1, 1914.
1,149,280.
Patented Aug. 10, 1915.
7 SHEETS—SHEET 7.
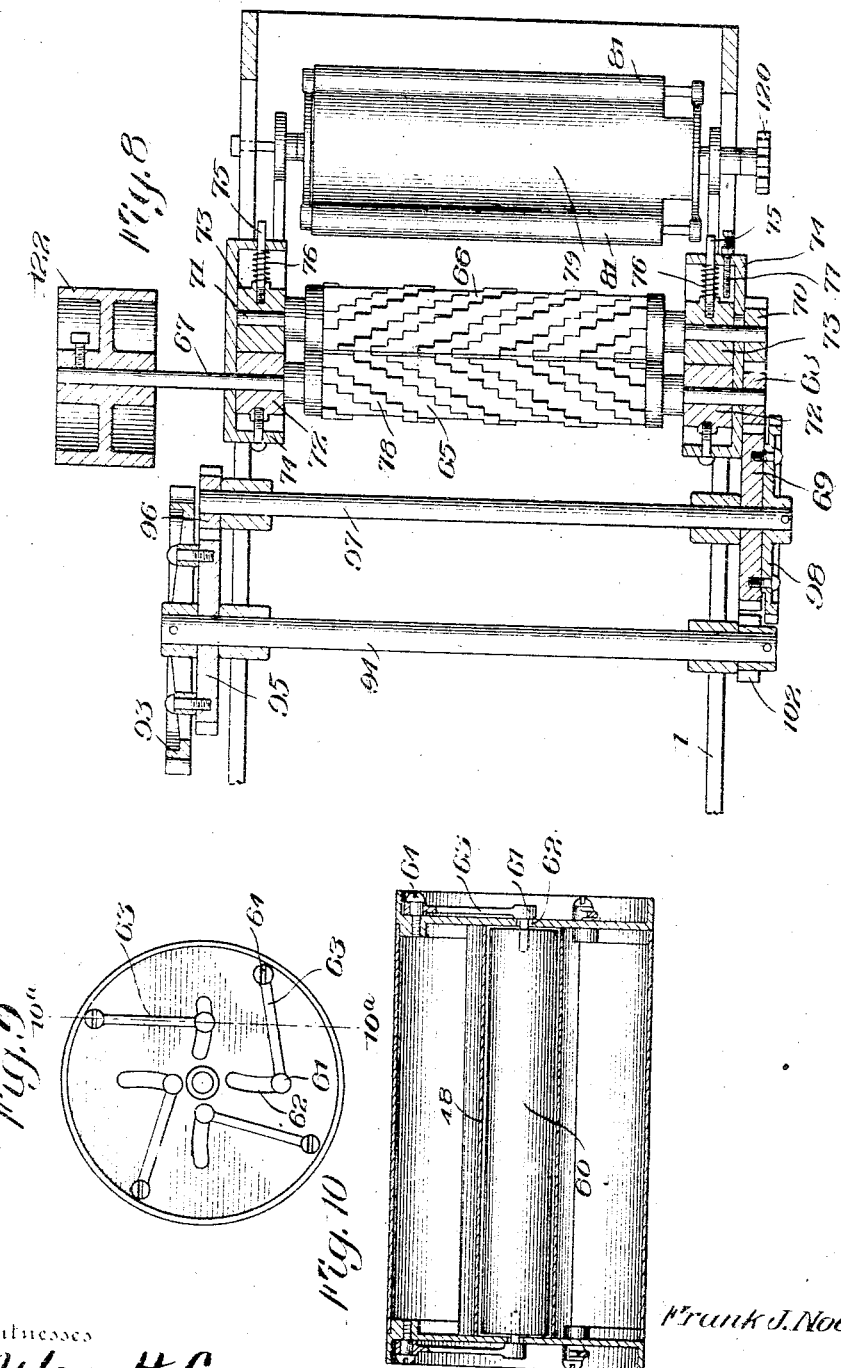
Witnesses
Nelson H. Copp
H. E. Stonebraker
Inventor
Frank J. Noechel
By Church Rich
his Attorneys

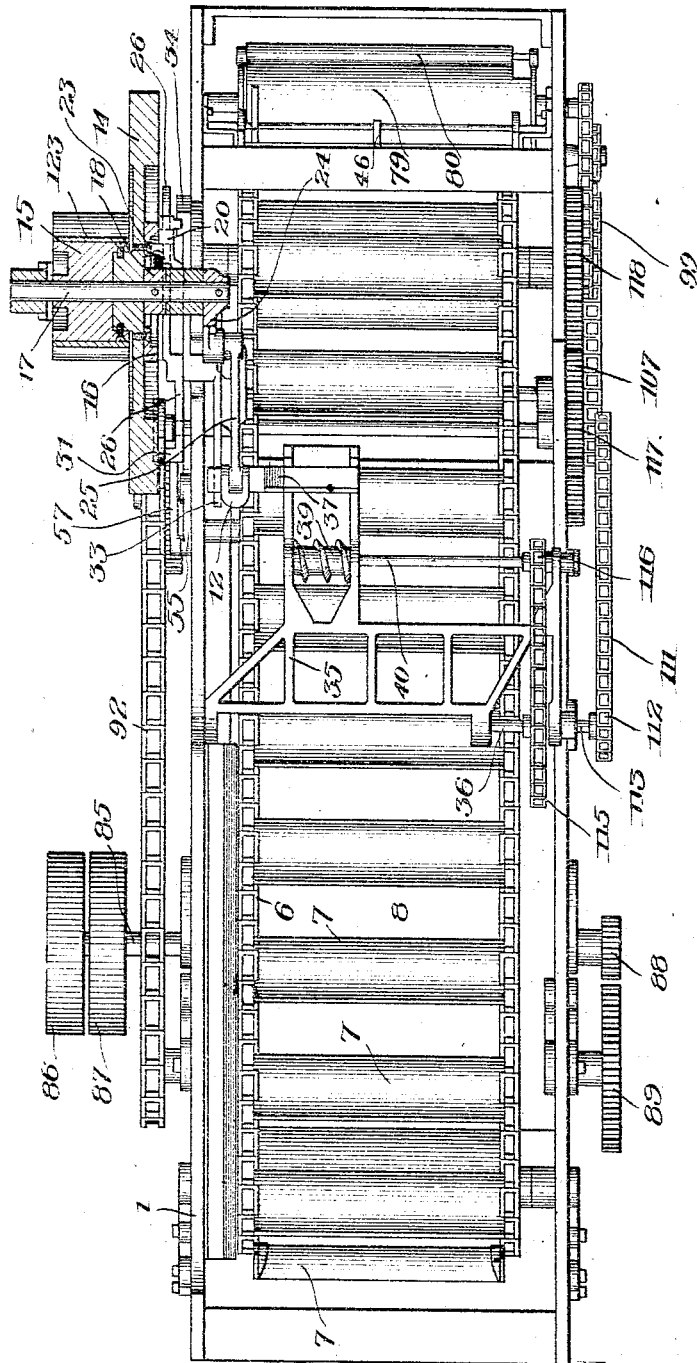

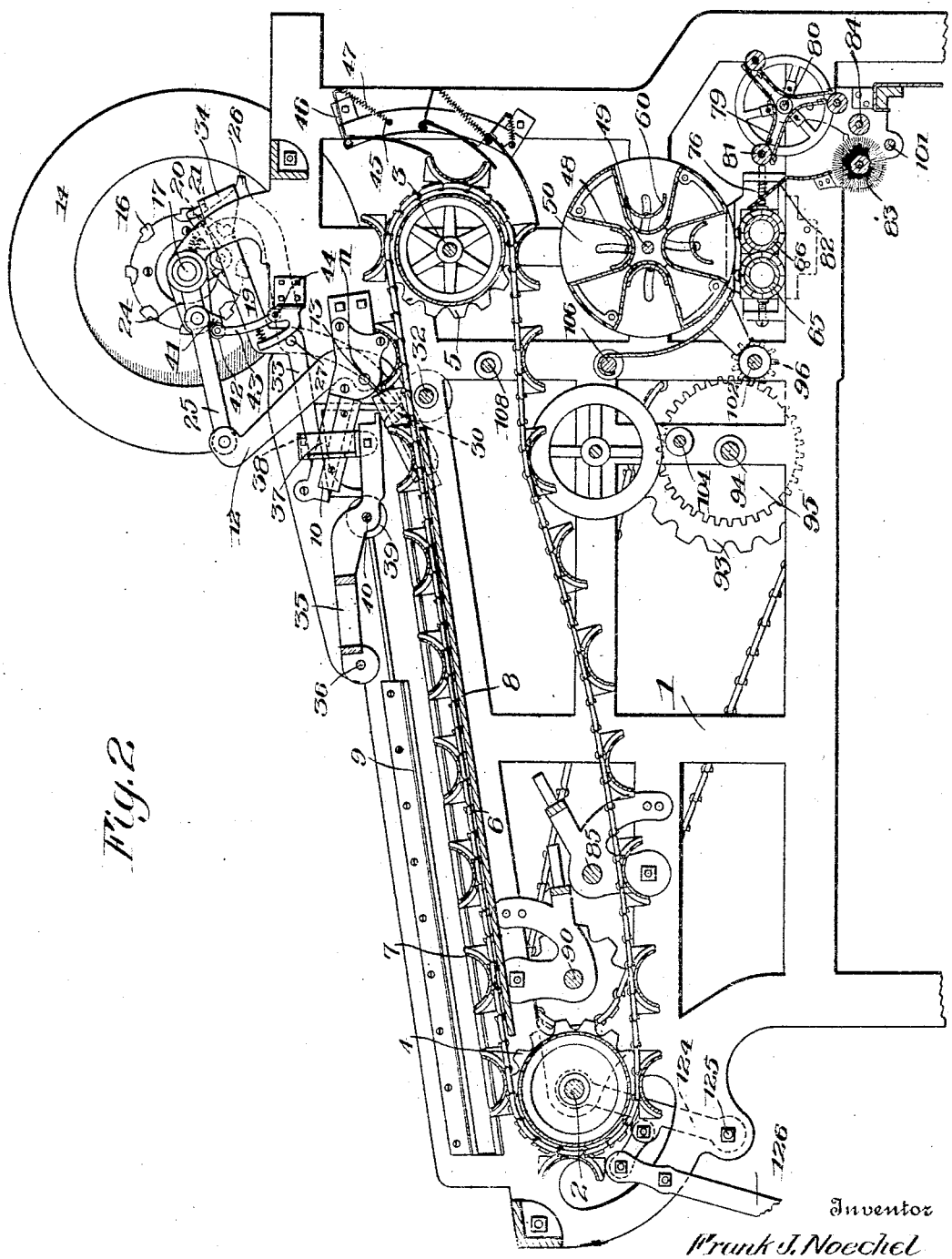

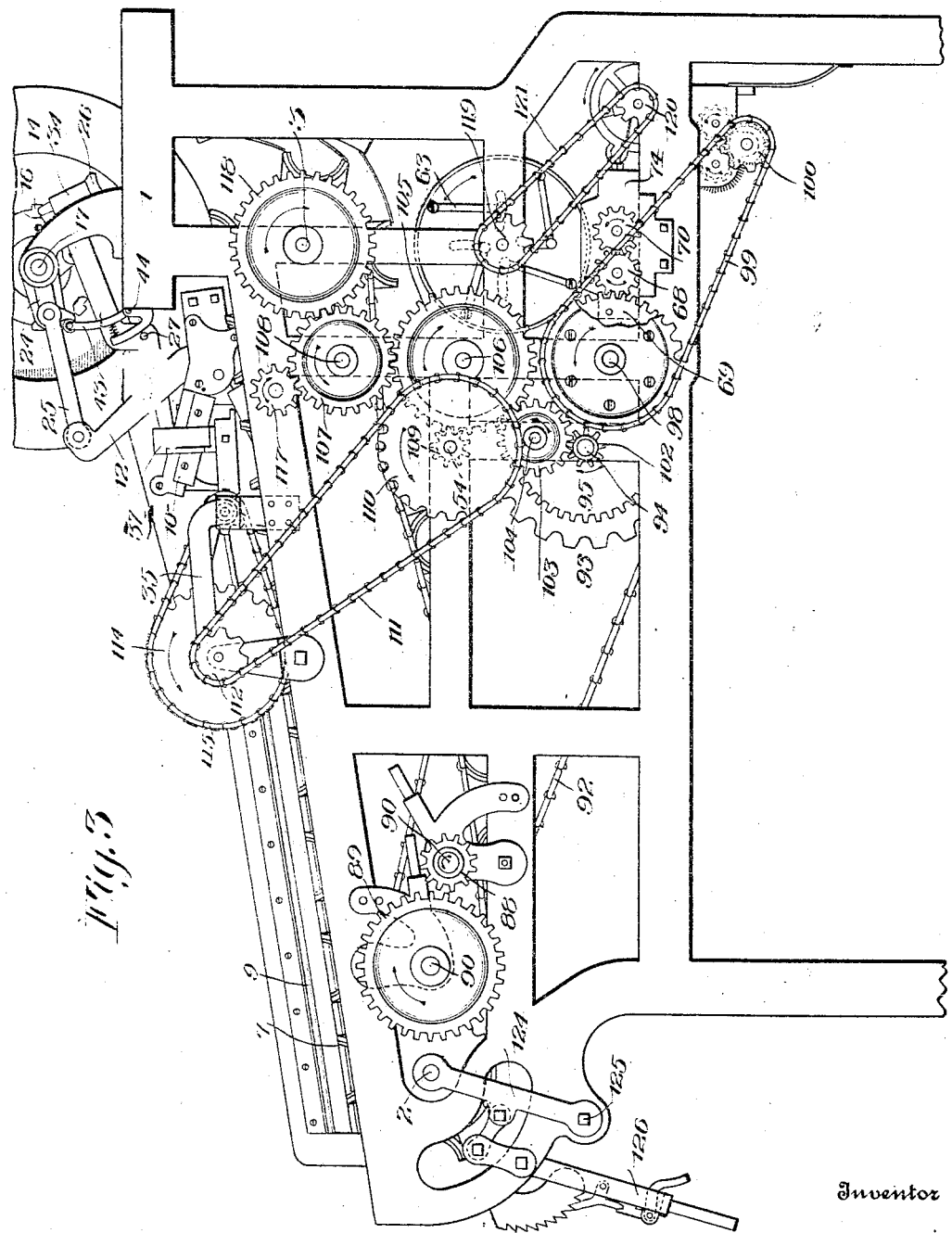

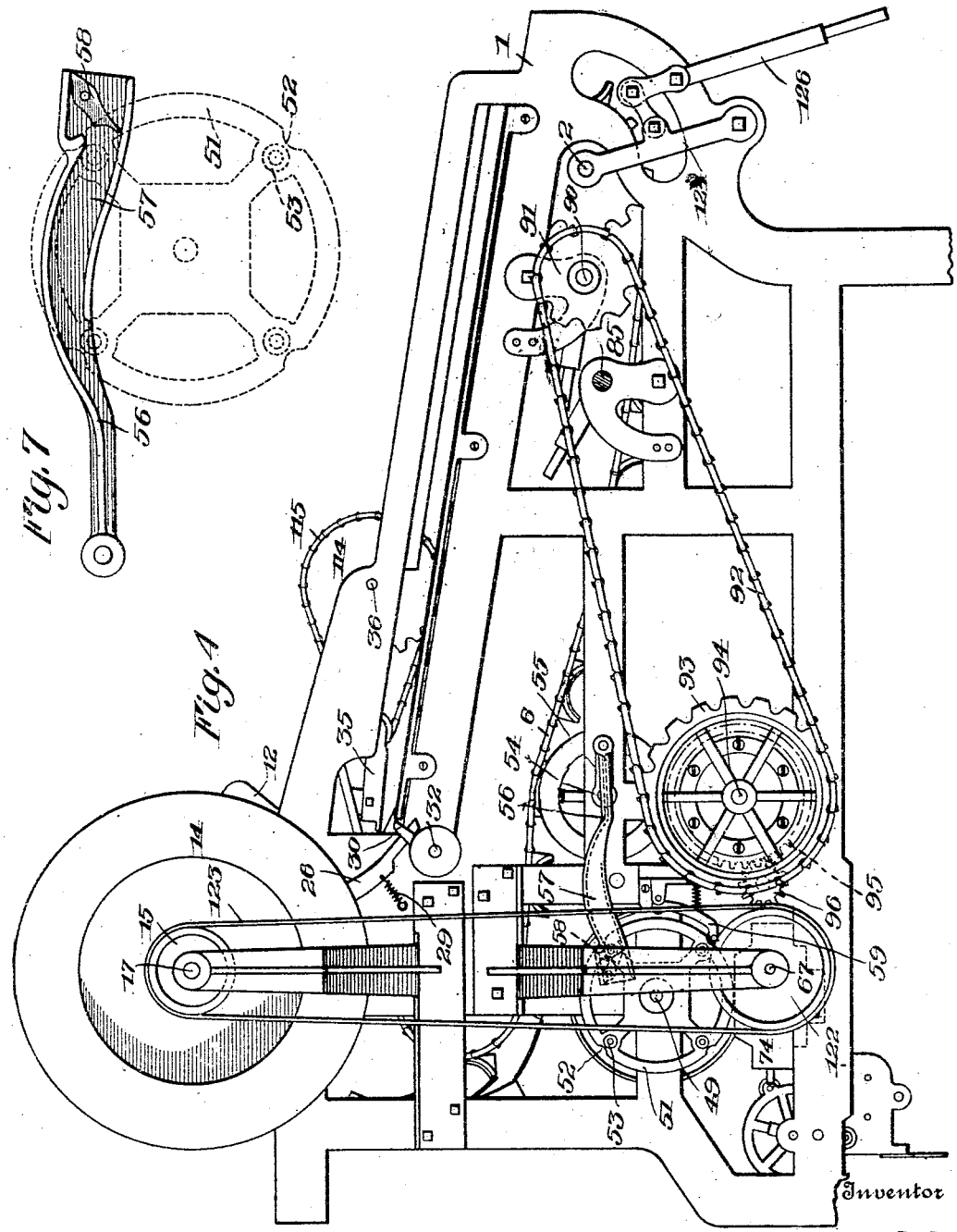

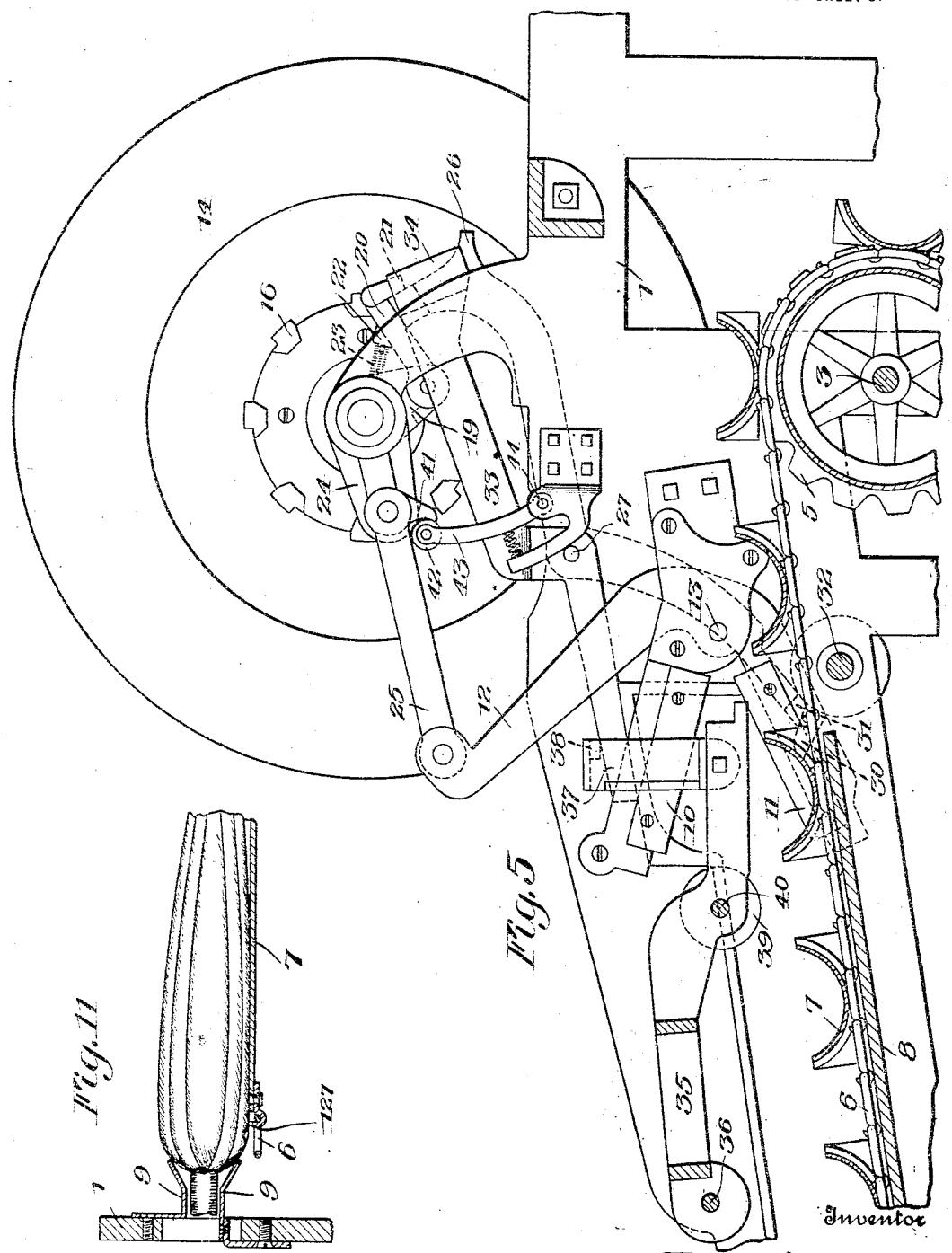

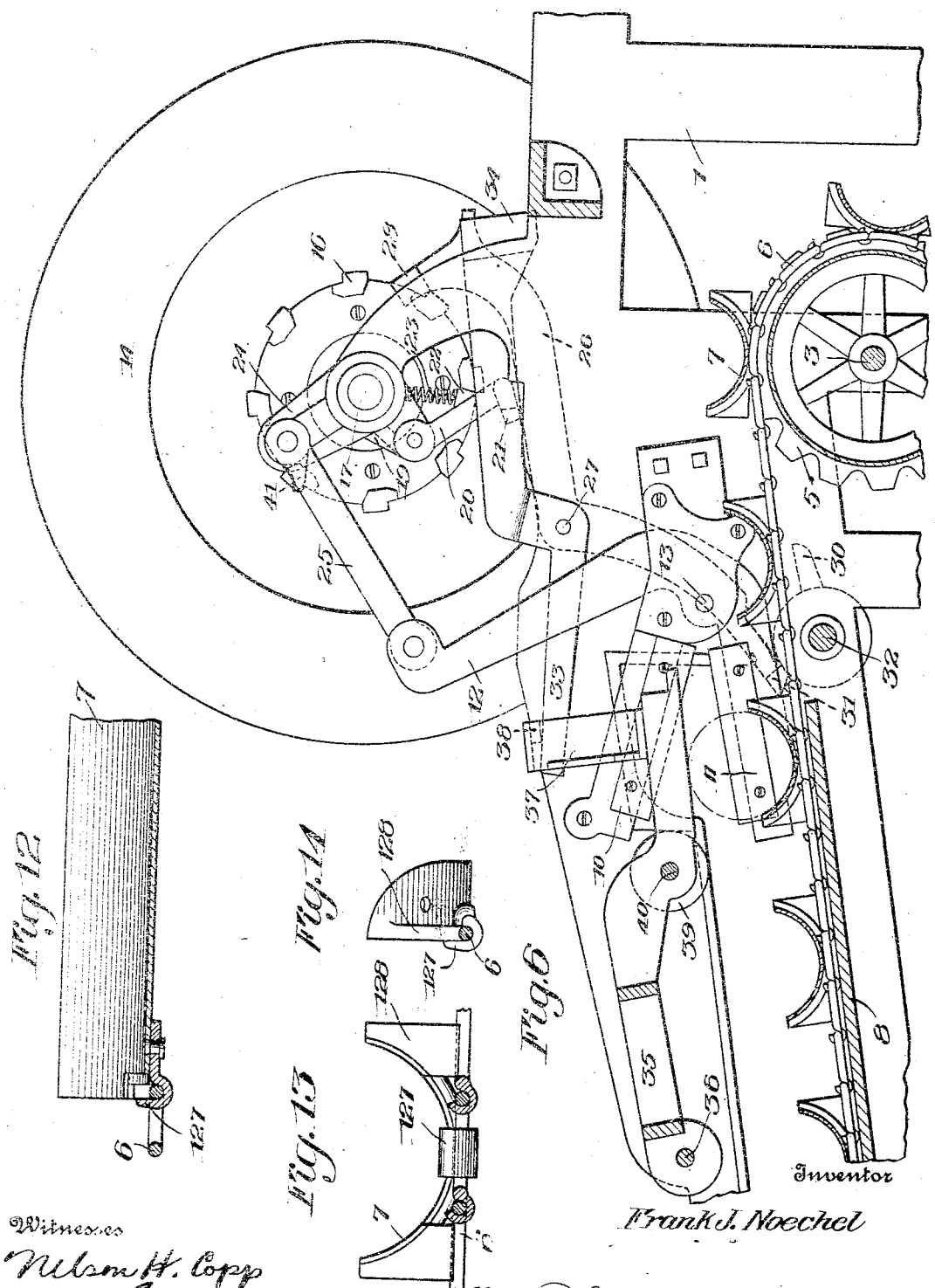

UNITED STATES PATENT OFFICE.

FRANK J. NOECHEL, OF ROCHESTER, NEW YORK.

CORN-HUSKING MACHINE.

1,149,280.　　　　Specification of Letters Patent.　　Patented Aug. 10, 1915.

Application filed May 1, 1914. Serial No. 835,614.

*To all whom it may concern:*

Be it known that I, FRANK J. NOECHEL, of Rochester, in the county of Monroe and State of New York, have invented certain new and useful Improvements in Corn-Husking Machines; and I do hereby declare the following to be a full, clear, and exact description of the same, reference being had to the accompanying drawings, forming a part of this specification, and to the reference-numerals marked thereon.

My invention relates to corn husking machines, and it has for its object to improve the construction of this class of apparatus generally, and to provide a mechanism that is entirely automatic, and positive in its operation throughout.

Among other purposes, the invention contemplates a novel arrangement and combination of parts and elements whereby an ear of corn can be fed in the condition as it is when first cut from the stalk, and be discharged from the machine with the surplus stem or butt removed, and with all of the husk and silk also separated.

One of the chief purposes of my improvements is to enable the operations to take place without injuring the grains of corn.

Another object of my invention consists in the provision of means for making the cutting mechanism as efficient and durable as possible, and I accomplish this result by making the cutting mechanism inactive or idle normally, during the continuous operation of the other parts of the machine, and having it operate only when an ear of corn is presented. This operation is effected entirely automatically so that in case an operator fails to feed the machine properly, the cutting mechanism will not be operating unnecessarily.

To these and other ends the invention consists in certain improvements and combinations of parts all as will be hereinafter more fully described, the novel features being pointed out in the claims at the end of the specification.

In the drawings: Figure 1 is a plan view of a machine constructed in accordance with one embodiment of my invention, and showing a portion thereof in section; Fig. 2 is a side elevation partly in section; Fig. 3 is a side elevation; Fig. 4 is a side elevation looking in the opposite direction to Fig. 3; Fig. 5 is an enlarged elevation, with parts in section, of the cutter controlling mechanism, with the parts in normal position; Fig. 6 is a similar view showing the position of the parts after a partial operation; Fig. 7 is a detail view; Fig. 8 is a sectional view taken horizontally through the husking rolls, and their coöperating parts; Fig. 9 is a detail view in end elevation of the transfer device or drum arranged above the husking rolls; Fig. 10 is a sectional view on the line 10a—10a of Fig. 9; Fig. 11 is a detail sectional view taken transversely of the conveyer; Fig. 12 is a vertical sectional view of one of the carriers; Fig. 13 is a transverse sectional view of the same, and Fig. 14 is a detail view in elevation, showing the conveyer in section.

Similar reference characters in the several figures indicate the same parts.

In order to afford a preliminary general idea of the operation of the machine, I will state that the ears of corn are fed, either by hand or automatically, onto an endless traveling conveyer, provided with a series of carriers, one for each ear. The conveyer carries the ear into the path of a cutting mechanism, the surplus stem or butt end being thereby severed by a movable cutter which operates automatically, only when an ear is presented. The ear is thence carried by the conveyer to the husk removing instrumentalities, being discharged into a transfer device which operates intermittently, receiving each ear as it passes from the conveyer, and holding it for a predetermined period of time in operative engagement with a pair of husking rolls which act to tear apart the leaves and to entirely separate the husk from the ear, the latter being thereupon discharged by the transfer device into a carrier which in turn presents it to a silk removing mechanism. After the ear leaves the silk removing mechanism, it is discharged from the machine into any suitable receptacle or container.

The present embodiment, which is illustrative of one method of carrying out my invention, comprises a frame 1 in which are journaled shafts 2 and 3 having suitable sprockets thereon designated at 4 and 5 to receive and drive the sprocket chain 6 constituting a part of the endless conveyer which is continuously driven in a manner that will be pointed out hereinafter. The conveyer embodies a series of separate and individual carriers 7 which are preferably curved in cross section as shown, and attached to the sprocket chain in any convenient manner. The carriers are of a shape that is best adapted to receiving an ear of corn regardless of its size and presenting it to the cutting mechanism which will presently be more fully described. The upper lap of the conveyer is supported by a suitable table 8, while 9 designated guides or guard rails for the purpose of limiting the lateral movement of an ear as it is placed on the conveyer by the operator, so that it will be in the proper position when presented to the cutting mechanism.

The cutting mechanism is preferably disposed at a point adjacent to one edge of the conveyer and embodies a stationary cutter and a movable cutter coöperating with the stationary cutter, the movable cutter being idle normally while the conveyer is continuously moving, and operable only when an ear is presented, by a means under the control of the ear on the conveyer, so that when an empty carrier passes the cutting mechanism, no operation of the movable cutter takes place. With this end in view, I provide a stationary cutter 10 and a movable cutter 11 coöperating with the stationary cutter. Preferably, I make use of an oscillatory cutter, although the essential idea of my invention may be adopted in conjunction with other types of cutters, as, for instance, a rotary or disk type. In the form shown, the movable cutter 11 is mounted upon a rock-arm 12 which is pivoted at 13 and connected to the driving mechanism, as will now be described.

The driving member embodies a fly wheel 14 connected to a pulley 15 which derives its motion in a manner that will be described hereinafter, and it is provided with a series of teeth or clutch faces 16 adapted to be engaged by a movable clutch on the driven member. The driven member comprises a shaft 17 on which is keyed a collar 18, the latter being provided with the ear 19. Pivotally mounted upon the ear 19 is the clutch 20 having a right angled end portion 21 and an angular abutment 22, while 23 is a spring connected to the collar 18 and to the clutch 20 in the manner shown. The position of the clutch when normal, and previous to the operation of the movable cutter, is shown in Figs. 2 and 5, the clutch being held out of operative engagement with the clutch elements 16 on the driving member by means about to be fully described. The driven member or shaft 17 has fixed thereon a crank arm 24, and 25 is a link connecting the crank arm 24 and the rock-arm 12, so that when the driven member has imparted thereto a complete rotation by the operation of the clutch, the movable cutter is oscillated to engage the stationary cutter and be returned to its normal position.

It is necessary to time the operation of the movable cutter so that it will come into engagement with the stationary cutter at the proper moment when a carrier is in such position as to bring an ear between the cutters. To this end I provide a locking lever which acts to hold the clutch out of engagement with the driving member normally, and is automatically operated at predetermined intervals to release the clutch. The locking lever referred to is indicated at 26 being pivoted at 27 and provided with an extension 28 which engages the portion 21 of the clutch as shown in Figs. 2 and 5. The locking lever 26 is held in normal position by a spring 29, and moved away from such position to release the clutch by means of a lug 30 which engages an angular portion 31 upon the lower end of the lever, as shown in Figs. 4 and 6. The lug 30 is mounted upon a shaft 32, the movement of which is timed to coincide properly with the movement of the conveyer, and it is driven in a manner which will be described later.

With the mechanism thus far described, an operation of the movable cutter will take place each time a carrier is presented to or passes the cutting mechanism whether it contains an ear of corn or not, and it is highly desirable to provide means for preventing the operation of the movable cutter except when the carrier is filled, thereby considerably increasing the efficiency and endurance of the cutting mechanism. To this end I provide a controlling lever which also serves to retain the clutch out of operative engagement with the driving member, the position of such controlling lever being determined by the ear of corn on the carrier as it approaches the cutter. This may be accomplished in the following manner. The controlling lever 33 is pivoted at 27 and is weighted at its outer end, as shown at 34, so as to cause it to release the clutch at the proper time. Normally, the controlling lever is in engagement with the clutch 20, as shown in Figs. 2 and 5, and it is held in this position by suitable means disposed above the conveyer and in the path of travel of the ears of corn. I accomplish this preferably by a frame 35 pivoted at 36 and held by its own weight in the normal position shown in Figs. 2 and 5. The frame 35 carries an upstanding portion 37 provided with an arm 38 which engages the adjacent end of the controlling lever 33, and holds the opposite end of said lever elevated and in engagement with the clutch 20. The frame 35 carries a feeding device, preferably in the form of a rotary worm 39 mounted upon a shaft 40 which is suitably driven, and the worm operates to engage an ear of corn as the latter passes under it and to feed it laterally toward the cutting mechanism.

It will be seen that when the worm 39 engages an ear on the conveyer, it causes the frame 35 to be elevated, thereby releasing the controlling lever 33 and permitting its weighted end 34 to drop out of engagement with the clutch. The locking lever 26 returns to its normal position immediately after the lug 30 has passed, and is ready to catch the clutch 20 after it has made one complete revolution, and to hold it out of engagement until the next operation. The controlling lever 33 is returned to its normal position by the dropping of the frame 35 as soon as the ear has passed from under said frame, and thereafter the clutch is held against movement until another ear comes into engagement with the frame. In order to retain the driven member 18 in its normal position, I provide the crank arm 24 with an ear or lug 41 adapted to be engaged by a yieldable stop preferably in the form of an anti-friction roller 42 carried by a spring actuated arm 43 which is pivoted at 44. When the clutch is released by the controlling and locking levers, its spring 23 forces it outwardly until the abutment 22 is in position to be engaged by one of the clutch elements 16 on the driving member, as shown in Fig. 6, a suitable stop being provided to limit the outward movement of the clutch.

After an ear passes the cutting mechanism it is carried to the husk removing instrumentalities, which I will now describe. The ear is discharged from the conveyer after it reaches the end of the upper lap thereof and passes downwardly to the lower lap, its position within the carrier during the movement around the end of the conveyer being determined by a plurality of spring actuated guards or followers, arranged one above the other and operating to engage the ear successively. Each of said followers is pivotally mounted, they being designated at 45, and carries an arm 46 which is connected to a part of the frame of the machine by a spring 47 acting to retain the follower in close engagement with the ear on the conveyer.

I have found that by using a series of guards such as described instead of a single spring actuated follower extending entirely around the end of the conveyer, I am able to hold the ear more positively, and during all stages of its movement, regardless of whether its diameter be comparatively large or small. After the corn is discharged from the endless conveyer, it passes to the husk removing instrumentalities, which include a pair of husking rolls and a transfer device arranged immediately above the husking rolls between them and the conveyer. Said transfer device is operated intermittently to receive an ear of corn at predetermined intervals and carry it around into engagement with the husking rolls where it is held for a predetermined period, the leaves of the husk being gripped and torn away from the ear while in this position. The transfer device referred to preferably comprises a drum 48 mounted upon a shaft 49 and including a series of pockets or receivers 50, into which the ears of corn are discharged as they pass from the conveyer.

In order to effect intermittent driving of the drum 48, the shaft 49 is provided at one end with a pulley 51, the periphery of which includes a series of notches 52, and attached to one side of the pulley at points adjacent to said notches are the projections 53. The pulley is actuated from a continuously operating shaft 54, carrying a crank 55, the latter being pivotally associated with an actuator that coöperates with the projections 53 on the pulley in such a manner as to drive the latter intermittently.

The actuator, which is designated generally at 56, has a hollow operating portion 57 and pivoted to one of the side walls thereof is a gravity pawl 58 which engages the projections 53 on the pulley in the manner shown. The hollow portion 57 is open at the end, adjacent to pawl 58 to permit it to receive the projection 53 on its return stroke.

In Fig. 4, parts are shown in the position occupied when the transfer device has completed one movement, the pawl 58 being closely engaged with a projection 53 and the actuator 56 has reached the end of its operative stroke. Upon the return stroke, the pawl 58 moves away from the projection which it has just previously engaged and the actuator 56 is carried backwardly until it engages the next adjacent projection 53 which passes under the gravity pawl 58, lifting the latter and thereafter freeing it, whereupon the advance stroke of the actuator causes said projection to be moved around until the drum is rotated a quarter of a turn. A spring actuated arm 59 is provided, carrying a roller at its free end for engagement with the recesses 52 so as to retain the drum in proper position when it is freed from the actuator during the return stroke of the latter.

The transfer device or drum is preferably provided with means for holding each ear in proper engagement with the husking rolls, and to this end I provide a series of gravity operated followers one for each pocket. Each follower is of curved formation, as designated at 60 to enable it to fit the bottom of the pocket and also the ear of corn closely, and carries projecting portions 61 which pass through slots 62 in the end of the drum and are connected to arms 63, the latter being pivotally mounted at 64. Thus it will be seen that when an ear is received into a pocket, the follower will be positioned at the base of the pocket, as shown in Fig. 2, and when the drum has made half a revolution, the follower will fall away from the bottom of the pocket and so assure bringing the ear into close engagement with the husking rolls.

The husking rolls are designated at 65 and 66, the roll 65 being fixedly mounted on a shaft 67 which carries at one end a pinion 68 driven by a gear wheel 69 to which power is supplied in any suitable manner. The pinion 68 meshes with a corresponding pinion 70 carried by the shaft 71 on which the aforesaid mentioned roll 66 is mounted. The shaft 67 is journaled in adjustable bearings 72 while the shaft 71 is journaled in yieldable bearings 73. The bearings 72 and 73 are slidably mounted in boxes 74, the bearings 73 being provided with guide rods 75 extending through openings in the boxes 74 and surrounded by springs 76 which serve to hold the yieldable roll in engagement with the fixed roll. The movement of the yieldable roll away from the fixed roll is limited so as to maintain the pinions 68 and 70 constantly in operative engagement, and to this end I provide an adjustable stop 77 arranged in the path of the yieldable bearings 73 and acting to prevent excessive relative movement between the fixed and the yieldable rolls. The rolls are provided preferably with hard metallic operative surfaces having spirally arranged raised or projecting portions 78 which may be formed as shown in Fig. 8, or in any other convenient manner. While the ear is held in engagement with the husking rolls, the leaves of the husk are grasped and torn from the ear, being discharged downwardly between the rolls, and the husked ear is then carried out of engagement with the husking rolls by the transfer device and discharged onto a carrier which transmits it to the silk removing means.

The carrier referred to embodies a series of receptacles 79 formed by suitable curved plates mounted on an intermittently rotated shaft 80. 81 designates longitudinally disposed rolls which are arranged at the receiving edge of the receptacles 79, while 82 is a wall arranged adjacent to the carrier and serving to retain the ears within the latter as it is rotated, causing them to be brought into engagement with the silk removing means, which is preferably in the form of a rotary bristle brush 83. Arranged adjacent to said brush is a supporting roll 84 from which the ear is discharged into any suitable receptacle or container.

I will now describe the gearing shown in the present embodiment, although it will be understood that the parts may be driven in any convenient manner. 85 designates the main drive shaft, carrying the pulleys 86 and 87, to which power is supplied from any suitable source. The shaft 85 carries a pinion 88 adapted to engage a gear wheel 89 on the shaft 90. The latter is mounted in adjustable bearings so as to move the gear 89 out of engagement with the pinion 88, in case it is desired to operate the machine by hand, in which event a handle is suitably connected to the shaft 90. The shaft 90 carries at its opposite end a sprocket wheel 91, from which a sprocket chain 92 connects with a sprocket wheel 93 mounted on the shaft 94. The shaft 94 also carries a gear wheel 95 in engagement with a pinion 96 on the shaft 97, which carries the gear wheel 69 hereinbefore referred to. Adjacent to the gear wheel 69 on the shaft 97 is a sprocket wheel 98 which is connected by a sprocket chain 99 with a second sprocket wheel 100 carried by a shaft 101 which is further provided with a gear wheel having engagement with corresponding gears arranged upon the shafts which carry the brush 83 and the supporting roll 84. The shaft 94 carries a pinion 102 gearing with a pinion 103 on the shaft 104. The pinion 103 drives the gear wheel 105 mounted on a shaft 106 and the latter, through gear 105, drives the gear 107 on shaft 108 and also pinion 109 mounted on the shaft 54, hereinbefore referred to. The latter carries a sprocket wheel 110 and 111 is a sprocket chain leading from the sprocket wheel 110 to the sprocket 112 mounted on the shaft 113. The latter also carries a sprocket wheel 114, and 115 is a sprocket chain leading therefrom and driving the sprocket 116 on the worm shaft 40. The gear wheel 107 drives the pinion 117 fixed on shaft 32. The gear 107 also drives the gear 118 on shaft 3.

The transfer device or drum 48 obtains its intermittent motion in a manner that has already been described, and the carrier which is mounted on the shaft 80 is also driven intermittently with the transfer device by means of sprocket wheels 119 and 120 arranged on the shafts 49 and 80 respectively and connected by the sprocket chain 121.

I have already described the manner of driving the husking rolls. The roll shaft 67 has fixed thereon a pulley 122 which is connected by means of a belt 123 with the pulley 15 loosely mounted on the shaft 17, as described previously, and constituting a part of the driving member. The shaft 2 is mounted in adjustable bearings carried by the arms 124 pivoted at 125, and which may be moved by means of the adjustable lever 126 to tighten or slacken the conveyer as desired.

The carriers are detachably mounted on the conveyer chains, and to this end, each carrier 7 is provided with hooks 127 which engage the lower edges of the underlying links, as shown in Figs. 12 and 13, while 128 are lugs on opposite sides of the hooks 127, arranged for engagement with the upper edges of the adjacent links. With this construction, the carrier can be readily attached and detached, and is held tightly while the conveyer is taut. To remove a carrier, the conveyer is slackened, permitting the links to drop away from the lugs 127, and thereafter enabling the hooks 127 to be separated from the chains which they engage. The tightening of the conveyer serves to hold the carriers rigidly, against accidental removal.

I claim as my invention:

1. In a corn husking machine, the combination with a continuously operating endless conveyer, of cutting means disposed adjacent to the conveyer, said cutting means being normally idle, a pivotally mounted frame arranged above the conveyer and adapted to be engaged and lifted by an ear of corn on the conveyer, a feeding device carried by said frame and operating upon an ear to move it laterally toward the cutting means, and means controlled by the frame and acting when it is elevated to operate the cutting means.

2. In a corn husking machine, the combination with a continuously operating endless conveyer, of cutting means disposed adjacent to the conveyer, said cutting means being normally idle, a pivotally mounted frame arranged above the conveyer and adapted to be engaged and lifted by an ear of corn on the conveyer, a continuously rotating worm carried by said frame and operating upon an ear to move it laterally toward the cutting means, and means controlled by the frame and acting, when it is elevated, to operate the cutting means.

3. In a corn husking machine, the combination with a continuously operating endless conveyer, of a stationary cutter, a movable cutter coöperating with the stationary cutter, a normally stationary driven member, connections between the driven member and the movable cutter, a driving member, a clutch for connecting the driving and driven members, and means controlled by an ear of corn on the conveyer for governing the position of said clutch to permit it to lock the driving and driven members together.

4. In a corn husking machine, the combination with a continuously operating endless conveyer, of a stationary cutter, a movable cutter coöperating with the stationary cutter, a normally stationary driven member, a clutch carried by the driven member, a driving member, a controlling lever normally in engagement with the clutch and acting to hold it out of engagement with the driving member, a frame pivoted above the conveyer and arranged to be engaged and elevated by an ear of corn on the conveyer, said frame being in engagement with the controlling lever and operating when elevated to release it from engagement with the clutch to permit the driven member to be actuated by the driving member.

5. In a corn husking machine, the combination with a continuously operating endless conveyer, of a stationary cutter, a movable cutter coöperating with the stationary cutter, a normally stationary driven member, a clutch carried by the driven member, a driving member, a controlling lever normally in engagement with the clutch and acting to hold it out of engagement with the driving member, a frame pivoted above the conveyer and arranged to be engaged and elevated by an ear of corn on the conveyer, said frame being in engagement with the controlling lever and operating when elevated to release it from engagement with the clutch to permit the driven member to be actuated by the driving member, a locking lever also in engagement with the clutch and operating normally to hold it out of engagement with the driving member, and continuously driven means operating to engage said locking lever intermittently and move it to release the clutch.

6. In a corn husking machine, the combination with a continuously operating endless conveyer, of a stationary cutter, an oscillatory cutter coöperating with the stationary cutter, a normally stationary driven member, connections between the driven member and the oscillatory cutter, a driving member, a clutch for connecting the driving and driven members, and means controlled by an ear of corn on the conveyer for governing the position of said clutch to permit it to lock the driving and driven members together and thereby effect oscillation of the movable cutter.

7. In a corn husking machine, the combination with a continuously operating endless conveyer, of a stationary cutter, an oscillatory cutter coöperating with the stationary cutter, a normally stationary driven member, a clutch pivotally arranged on the driven member, a driving member, a controlling lever normally in engagement with the clutch and acting to hold it out of engagement with the driving member, and a frame pivoted above the conveyer and arranged to be engaged and elevated by an ear of corn on the conveyer, said frame being in engagement with the controlling lever and operating when elevated to release the same from engagement with the clutch to permit the driven member to be actuated and to oscillate said cutter.

8. In a corn husking machine, the combination with a continuously operating endless conveyer, of a stationary cutter, an oscillatory cutter coöperating with the stationary cutter, a normally stationary driven member, a clutch pivotally arranged on the driven member, a driving member, a controlling lever normally in engagement with the clutch and acting to hold it out of engagement with the driving member, a frame pivoted above the conveyer and arranged to be engaged and elevated by an ear of corn on the conveyer, said frame being in engagement with the controlling lever and operating when elevated to release the same from engagement with the clutch to permit the driven member to be actuated and to oscillate said cutter, a locking lever also in engagement with the clutch and operating normally to hold it out of engagement with the driving member, and continuously driven means operating to engage said locking lever intermittently to release the clutch.

9. In a corn husking machine, the combination with a continuously operating endless conveyer, of a stationary cutter, a movable cutter coöperating with the stationary cutter, and means controlled by an ear of corn on the conveyer operating to actuate said movable cutter, the last mentioned means being also controlled by a continuously driven device.

10. In a corn husking machine, the combination with a continuously operating endless conveyer, of a movable cutter, a normally stationary driven member, connections between the driven member and movable cutter, a driving member, a clutch for connecting the driving and driven members and means controlled by an ear of corn on the conveyer for governing the position of said clutch to permit it to lock the driving and driven members together.

11. In a corn husking machine, the combination with a continuously operating endless conveyer, of a movable cutter, and means controlled by an ear of corn on the conveyer operating to actuate said movable cutter, and a continuously driven device controlling the last mentioned means.

FRANK J. NOECHEL.

Witnesses:
H. E. STONEBRAKER,
RUSSELL B. GRIFFITH.